(No Model.)
J. SUYDAM.
FLEXIBLE COUPLING FOR PIPES.
No. 479,856. Patented Aug. 2, 1892.
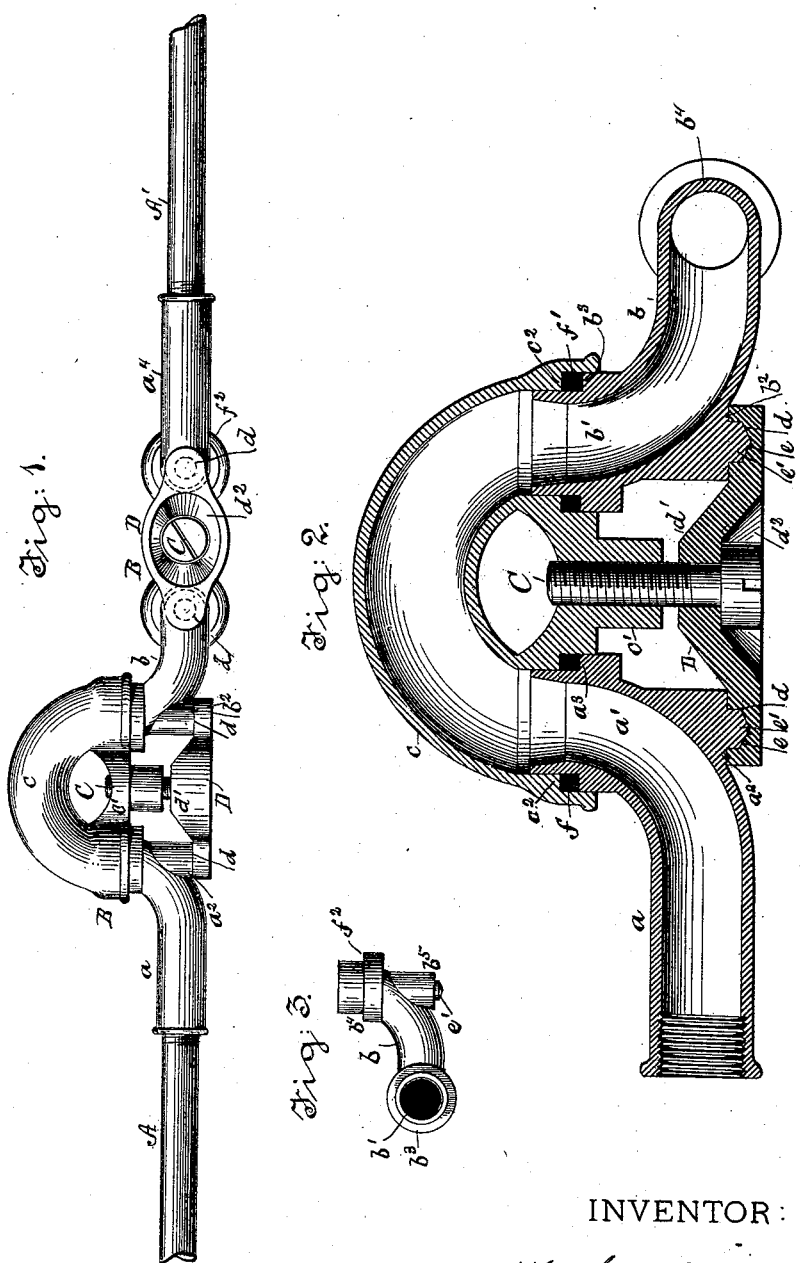
WITNESSES:
INVENTOR:
John Suydam
By H. A. West
Attorney.

UNITED STATES PATENT OFFICE.

JOHN SUYDAM, OF ALBANY, NEW YORK.

FLEXIBLE COUPLING FOR PIPES.

SPECIFICATION forming part of Letters Patent No. 479,856, dated August 2, 1892.

Application filed October 31, 1891. Serial No. 410,456. (No model.)

*To all whom it may concern:*

Be it known that I, JOHN SUYDAM, a citizen of the United States, and a resident of Albany, in the county of Albany and State of New York, have invented certain new and useful Improvements in Flexible Couplings for Pipes, of which the following is a specification.

The object of my invention is to provide a practical flexible coupling for metal pipes, designed more especially for steam, air, and water pipes or conduits, wherein shifting or shortening or lengthening of the conduit is desirable, as with the steam-pipe used with steam-drills; and to this end my invention consists, namely, in a flexible pipe connection or coupling comprising pivoted or adjustable sections and a connecting-pipe united to the adjacent ends of the pivoted sections by suitable means which permit free adjustment of the sections.

The invention also consists in the construction, arrangement, and combination of parts hereinafter described and claimed.

Reference is to be had to the accompanying drawings, in which like letters of reference indicate corresponding parts in all the figures.

Figure 1 is a plan view of my invention applied as a double joint or union between two pipes. Fig. 2 is an enlarged sectional elevation through the center of one of the joints, and Fig. 3 is a plan view of one of the sections.

A A' represent two metal pipes, and B B two couplings at right angles to each other, which unite them and which are so constructed as to permit the said pipes A A' to be placed at any desired angle to one another, either vertical or horizontal, or they may be turned parallel with one another.

The couplings B are substantially duplicates of each other and are constructed as shown in Fig. 2, each comprising four main parts—viz., the two hollow sections $a$ and $b$, the connecting-pipe $c$, and the yoke D. The section $a$ is formed with a lateral round neck $a'$ and with a journal or bearing $a^2$ in line with the axis of the neck, and the outer surface of the said neck is formed with a seat $a^3$ for packing $f$. The section $b$ is formed at one end with a round lateral neck $b'$ and with a bearing $b^2$ in line with the axis of the neck, and the outer surface of the neck is formed with a seat $b^3$ for packing $f'$. At its opposite end said section $b$ is formed with another hollow and round lateral neck $b^4$ and bearing $b^5$ at right angles or thereabout to the neck $b'$, as shown clearly in Fig. 3, and the outer surface of this neck is formed with a seat $f^2$ for packing. The section $a^4$ is a duplicate of section $a$. The connecting-pipe $c$ is curved and is formed with a bridge $c'$ to receive a bolt C for clasping the yoke D and the connecting-pipe firmly together. The open ends or ports of the said connecting-pipe receive the necks of the sections $a\ b$ and are enlarged to form seats $c^2$ for the packing, as clearly shown in Fig. 2.

The yokes D are each formed with two seats $d$, and these are, by preference, formed with sockets $e$ to receive the studs $e'$, formed on the sections $a\ b$, to prevent displacement, and said yoke is, by preference, projected inward in the center, as shown at $d'$, and recessed at its outer surface, as shown at $d^2$, to inclose the head of the bolt C, as shown.

The parts being put together, as shown in Fig. 2, by turning up the bolts, the sections and the connecting-pipes become united by steam-tight joints, so that fluids or gases may pass freely from pipe A to A' without escape, and these pipes may be held in line with each other or they may be easily turned to any desired angle without disturbing the couplings more than to turn the sections thereof in and upon their bearings.

Having thus described my invention, what I claim as new, and desire to secure by Letters Patent, is—

1. A coupling for pipes, comprising two sections, each formed with a lateral neck and a bearing in line with the neck, in combination with a connecting-pipe formed with a bridge and a yoke and bolt for holding the said lateral necks and the ends of the connecting-pipe firmly together, substantially as shown and described.

2. The connecting-pipe $c$, formed with a bridge $c'$ and with open ports and seats for packing, the yoke D, formed with seats $d$, and the bolt C, in combination with the sections $a\ b$, formed with lateral necks and seats for packing, and bearings in line with the necks and fitted in the ports of the connecting-pipe, substantially as described.

3. The couplings B B, connected to pipes A

A′ by sections $a'$ $a^4$, in combination with the intermediate section $b$, formed at the ends with lateral necks arranged at different angles and formed with bearings in line with the necks, substantially as described.

4. The section $a$, formed with a lateral neck $a'$ and with a stud $e'$, and the section $b$, also formed with a lateral neck and with a stud, in combination with the yoke D, formed with recesses $e$, the bolt C, and the connecting-pipe $c$, formed with a bridge $c'$ and with open ports to receive the lateral necks of the said sections $a$ $b$, substantially as described.

Signed at Albany, in the county of Albany and State of New York, this 24th day of October, A. D. 1891.

JOHN SUYDAM.

Witnesses:
HORACE L. HICKS,
HARRY L. SHORT.